3,388,067
OLEAGINOUS COMPOSITIONS OF IMPROVED VISCOSITIES CONTAINING DEGRADED ETHYLENE-ALPHA OLEFIN POLYMERS
Herbert Takashima, New York, N.Y., and Norman Jacobson, East Brunswick, and Darrell W. Brownawell, Scotch Plains, N.J., assignors to Esso Research and Engineering Company, a corporation of Delaware
Filed Mar. 21, 1966, Ser. No. 535,817
4 Claims. (Cl. 252—55)

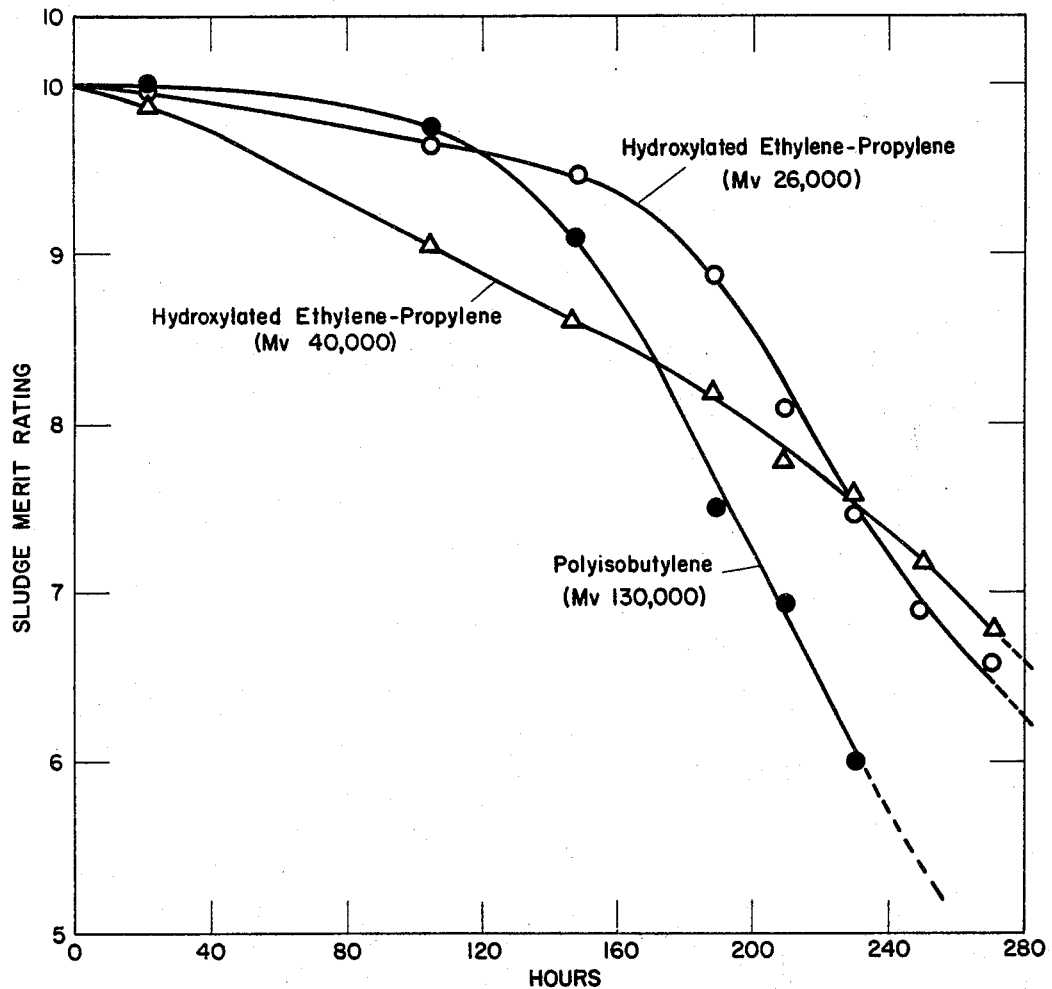

This invention relates to novel polymerization products of ethylene and alpha-olefins which are suitable for use as additives in oleaginous compositions and, more particularly, relates to hydrocarbon oil compositions containing certain polymerization products of ethylene and alpha-olefins, especially propylene, which have been hydroxylated as hereinlater defined more fully. When added to oleaginous compositions, these polymerization products improve said compositions with respect to viscosity index while exhibiting thickening potencies and shear stabilities superior to conventional additives similarly employed.

An important property of an oleaginous composition is the rate at which its viscosity changes as a function of temperature. The relationship between the viscosity and temperature is commonly expressed in the art as the viscosity index (V.I.). Oleaginous compositions which change little in viscosity with variations in temperature have a greater viscosity index than do compositions whose viscosity is materially affected by changes in temperature. It is readily apparent, therefore, that one of the major requirements of lubricating oils or other hydrocarbon oil products is their satisfactory viscosity-temperature characteristics. These charactertisics are necessary in order that the oils will not lose their fluidity but will show an equally good performance within a relatively wide temperature range to which they may be exposed in service. The wider the possible temperature variations, the smaller should be the change in viscosity with temperature. Hence, the viscosity-temperature characteristics of a lubricant which is used in applications where wide variations in temperature are encountered are of great importance and lubricant compositions having high viscosity indices are highly desirable.

In refining natural petroleum oils or in preparing synthetic oils, it is economically feasible to improve their viscosity index only up to a certain maximum inasmuch as further treatment has only an additional negligible effect on viscosity index characteristics. Further marked improvement can be effected, however, by adding to said compositions various types of additives for viscosity index improvement. In raising the viscosity index of oleaginous compositions by additives, recourse has been made to the introduction of long-chain compounds of the nature of linear polymers; generally the highest V.I. increase being obtained from polymers of the greatest chain length. While such polymeric products have been generally satisfactory in V.I. improvement, there has, up to the instance of the present invention, been a limit to V.I. improvement without incurring concomitant limiting factors.

For example, besides the attainment of V.I. improvement, consideration must also be given to the solubility of the polymer additive in the base composition, as well as the additive stability against breakdown under shear stresses encountered in its application. In the synthesis of polymeric V.I. agents to date, it has generally been found that solubility and shear stability are inversely proportional to the molecular weight of the polymer. Since the greatest V.I. effect has been obtained from polymers of the highest molecular weight, effectiveness has, disadvantageously, been sacrificed in order to insure proper stability in respect to resistance against shear stresses and to attain the desired solubility of the additives. Thus, the V.I. improving characteristic of additives has been undesirably restricted by limitation of one of the aforementioned characteristics.

Another feature of V.I. improvers is the amount of additive necessarily utilized in order to attain the desired V.I. improvement. This measure of effectiveness of an additive, as reflected by the amounts utilized, may be referred to as the thickening potency of the additive. It is readily apparent, therefore, that in addition to effective V.I. improvement with accompanying shear stability, solubility, etc., it is highly desirable to prepare a V.I. improver which has a thickening potency such that smaller amounts of additive as compared to amounts conventionally employed can be utilized to attain the desired improvements.

Accordingly, it is an object of this invention to provide additives which improve the viscosity-temperature characteristics of oleaginous compositions. It is also an object of this invention to provide additives which improve the viscosity-temperature characteristics of oleaginous compositions and which further exhibit exemplary shear stabilities, thickening potencies, solubilities, etc. It is a further object of this invention to provide oleaginous compositons having improved viscosity-temperature characteristics. Another object is to provide lubricant compositions having improved viscosity indices. A further object of this invention is to provide lubricant compositions which exhibit superior properties, e.g., shear stability, thickening potency, solubility, etc., in addition to improved viscosity indices. Other objects and advantages of the invention will become apparent from the following description thereof.

In accordance with this invention, the above objects, among others, are achieved by incorporating into an oleaginous composition a soluble modified ethylene-alpha-olefin copolymer. In contrast to the detailed attention heretofore given to the improvement of oleaginous compositions as to viscosity index, pour depressant, etc. qualities through the use of polymers, copolymers and terpolymers of alpha monoolefins prepared by means of conventional catalysts, e.g. Friedel-Crafts or Ziegler type catalysts, the present invention is directed to the preparation and use of polymers, copolymers and terpolymers of such materials which have been modified. Accordingly, it has been discovered that these known polymeric materials such as ethylene-alpha-olefin, e.g., rubbery ethylene-propylene copolymers, and terepolymers, e.g. the rubbery ethylene-propylene-methylene norbornene terpolymer may be subjected to a controlled oxidation using molecular oxygen or a gas such as air which contains molecular oxygen, with or without the aid of substances which have heretofore been employed and are known as free radical initiators. As will be hereinafter more fully described, a number of methods can be employed for finally producing the modified polymer.

The present invention contemplates polymers and copolymers of certain alpha-olefins and especially copolymers of ethylene and at least one alpha monoolefin said alpha-olefin having the structure R–CH=$CH_2$ where R is an alkyl radical, branched or unbranched, preferably unbranched, and preferably having not more than eight carbon atoms.

Representative examples of the preferred alpha-olefin having the structure R—CH=$CH_2$ wherein R is a $C_1$ to $C_8$ alkyl radical include: propylene; 1-butene; 4-methyl-1-pentene; 1-pentene; 1-hexene; 1-heptene; 1-octene; 1-nonene; 1-decene; 5-methyl-1-nonene; 5,5-dimethyl-1-octene; 4-methyl-1-hexene; 4,4-dimethyl-1-pentene; 5-methyl-1-hexene; 4-methyl-1-heptene; 5-methyl-1-heptene;

6-methyl-1-heptene; 4,4-dimethyl-1-hexene; and 5,6,6-trimethyl-1-heptene.

Conventionally, these copolymers are prepared using Friedel-Crafts type catalysts or using the Ziegler type catalysts. These reactions are well known and are conventionally employed. Accordingly, the present invention is not predicated upon the particular catalyst system employed in preparing the copolymer starting materials.

The copolymerization reaction of ethylene with at least one other olefinic monomer results in soluble copolymers in excess of 50 and up to about 500,000 viscosity average molecular weights. The catalytic systems, temperatures, presures, reaction diluents, feedstock compositions and the like are described in detail in the prior art. The catalysts employed are complexes or mixtures of a reducing metal compound with a reducible metal compound. The preferred reducing metal compound is an organo aluminum compound having the general formula:

$$(R)_x Al (X)_y$$

where $x$ and $y$ are 1 or 2 and the sum of $x$ plus $y$ is 3, each R is a hydrogen atom, a $C_1$–$C_6$ alkyl or aryl radical and X is a hydrogen or halogen atom or an alkoxy, aryloxy, secondary amino, amido, mercapto group, and the like. Specific examples of such aluminum compounds are: aluminum triethyl, aluminum trimethyl, aluminum triisopropyl, aluminum diethyl chloride, aluminum diethyl bromide, aluminum ethyl dichloride, aluminum ethyl dibromide, ethyl aluminum dihydride, diethyl aluminum hydride, ethoxy aluminum diethyl, aluminum diphenyl chloride, aluminum triphenyl and aluminum hydride. The preferred aluminum compounds are diethyl aluminum chloride and an admixture of diethyl aluminum chloride with ethyl aluminum dichloride.

The reducible metal compound is a compound of a metal selected from the group consisting of: IVa, Va, VIa, and VII of the Periodic Chart of the Atoms as described by Henry D. Hubbard, 1956 revised edition. Such elements include: titanium, zirconium, hafnium, thorium, uranium, vanadium, tantalum, chromium, molybdenum, tungsten, iron, cobalt, nickel and the like. Examples of the compounds of these metals which may be used include the chlorides or bromides or oxy chlorides or oxy bromides, oxides and hydroxides, alcoholates, acetates and benzoates. The preferred salts are titanium tetrachloride, titanium oxychloride, vanadium tetrachloride and vanadium oxychloride. The catalyst mixture is prepared by simply mixing the aluminum compound with the reducible heavy metal compound in the presence of an inert organic reaction diluent. At least 1 mole of the metal compound having reducing properties is admixed per mole of reducible metal compound. Preferably the molar ratio of the reducing metal compound to the reducible metal compound is in the range of about 1.5:1 to about 6:1. A sufficient amount of this catalytic mixture is added so that about 0.2 and about 15 wt. percent of the catalyst components are present in the reaction mixture.

The polymerization reaction is carried out generally in the range of between about 60° and about 100° C. with agitation at atmospheric pressure or under superatmospheric pressures up to as high as 2,000 p.s.i.g. The time of reaction varies between about 0.2 and about 15 hours, preferably between about 0.5 and about 5 hours. The amounts of ethylene to alpha-olefin fed to the reaction may vary between about 15 mole percent to 85 mole percent alpha-olefin, preferably between about 30 mole percent and about 60 mole percent alpha-olefin.

In the case of the preparation of the terpolymers, the two monomeric feed components used in making the ethylene-propylene copolymer are usually employed and the same catalyst reaction conditions, etc. are employed. In addition, however, in the case of the terpolymer, a third unsaturated monomer, namely nonconjugated diolefin, is employed which may be one or more of the following: cyclopentadiene, 2-methylene-5-norbornene, a noncon- jugated hexadiene, or any other alicyclic or aliphatic nonconjugated diolefin having from 6 to 15 carbon atoms per molecule such as 2-methyl norbornadiene, 2,4-dimethyl-2,-octadiene, and 3-(2-methyl-1-propene) cyclopentene. The aforementioned terpolymers are also well known in the art. The amount of the third monomer present in the feed is usually within the range of between about 0.5 and about 20 mole percent, preferably between about 1 and about 7 mole percent, based on the total amount of ethylene and propylene present.

Both with regard to the copolymerization and terpolymerization reaction, the preferred reaction conditions involve the use of various solvents as the organic diluent and reaction medium. Various solvents may be used in the copolymer preparation and they include aliphatic, naphthenic, aromatic and halogenated hydrocarbon solvents, mineral oils, or an excess of the higher alpha-olefin such as propylene may be used. Examples of solvent include n-hexane, heptane, propane, cyclohexane, benzene, toluene xylenes, tetrachloroethylene, decalin and chlorobenzenes, preferably, n-hexane.

The use of a temperature of about 70° C., a pressure of about 60 p.s.i.g., a time of reaction of about 30 minutes: using 0.2 wt. percent in the reaction mixture of a catalyst composed of 1 mole of vanadium oxytrichloride and 4 moles of diethyl aluminum chloride. A typical feedstock in the case of the copolymerization reaction involves about 50 wt. percent of ethylene and about 50 wt. percent of propylene and in the case of a terpolymerization, about 48 wt. percent ethylene, about 48 wt. percent propylene, and about 4 wt. percent 2-methylene-5-norbornene. Typically the copolymer has a viscosity average molecular weight of about 150,000 in which the range or distribution of molecular weight is, as mentioned, between about 50 and about 500,000. Typically a terpolymer, under these conditions, also has a viscosity average molecular weight of about 150,000 with a molecular weight range distribution of between about 50 and about 500,000.

The ethylene monomer unit concentration in the copolymer ranges in general from about 20% to about 85% by weight, preferably 30% to 75% by weight. Copolymers having concentrations of ethylene monomer units outside these ranges tend to be insoluble in lubricating oils, fuels, and the like. The third monomer component generally comprise no more than 20% by weight of the terpolymer, i.e., about 0.5 to 20% by weight and preferably 1 to 7% by weight.

In accordance with this invention, the heretofore mentioned copolymers, for example, rubbery ethylene-propylene copolymers, or terpolymers, for example, the rubbery terpolymer of ethylene, propylene and methylene norbornene, may be subjected to a controlled oxidation using molecular oxygen or a gas such as air which contains molecular oxygen with or without the aid of substances which have heretofore been employed and are known as free radical initiators. Such free radical initiators which may be employed may be represented, for example, by ozone, hydroperoxides, e.g. cumene hydroperoxide, p-methane hydroperoxide and ti-butyl hydroperoxide, peroxides, e.g. dicumyl peroxide, benzoyl peroxide, azo compounds, e.g. azo-bis(isobutyronitrile), peracids, peresters, persulfides, and the like.

The controlled oxidation may be carried out preferably, although not necessarily, in the presence of a suitable solvent such as benzene, chlorobenzene, tertiary butyl benzene, normal pentane, normal hexane, normal heptane or, when using a solvent which is not as inert as those mentioned but which will itself be oxidized such as cumene, diisopropyl benzene, or decalin; the starting material, i.e., material to be oxidized may be any one of the heretofore mentioned polymeric materials which contain at least 1, and preferably 7 tertiary carbon atoms per molecule, which tertiary carbon atoms contain a hydrogen atom directly connected thereto.

The solution is usually maintained at a temperature between about 40° and 150° C., preferably between about 50° and 70° C., for a period of time ranging between about 1 hour and 24 hours, preferably, between about 2 hours and about 9 hours. It is found that the more vigorous the oxidation conditions and the longer the reaction period, the larger the amount of oxygen, e.g. in the form of hydroperoxide (HOO) radicals, introduced into the starting material. The reaction conditions may be varied over considerable ranges and the correlation may be varied between the temperature of the reaction and the time of reaction.

The present invention also contemplates oxidation reactions utilizing oxidizing agents without the use of air but which serve to degrade the polymers. Illustrative of these well-known agents include nitric oxide, ($N_2O_4$), peracids, peroxides, cupric salts, etc.

Generally, it is sufficient if at least 1 hydroperoxide radical (HOO) is introduced into each molecule of the starting material. The amount of oxygen introduced preferably ranges from about 1 to 50 millimoles of hydroperoxide groups (HOO) per 100 grams of polymeric product and, preferably 2 to 20 millimoles as determined iodometrically. It is conceivable that some of the oxygen introduced into the polymer molecule is introduced in the form of peroxides, percacids, and the like, in addition to the hydroperoxides introduced. As mentioned, in order to attain the desired utility of the final products produced, i.e. as additives in oleaginous compositions, it is expedient that a sufficient number of tertiary carbon atoms containing hydrogen atoms attached directly thereto are present in each molecule so that a degradation or cleavage of the polymeric chains can be effected to substantially reduce the molecular weight of the original starting material.

In accordance with this invention, the hydroperoxidized material is subsequently reduced by contacting such material, while still in solution or suspension or as a solid, with a reducing agent. A suitable reducing agent is one which is capable of reaction with hydroperoxide groups on the polymer. Applicable methods for reducing the hydroperoxide groups include reaction with sodium sulfide, lithium aluminum hydride, sodium borohydride, tertiary phosphines, triethyl phosphite, hydrazine hydrate, aluminum amalgum, alkaline sodium sulfide, hydroiodic acid, zinc dust-acetic acid, and the like. Reaction with acids or alkali as well as thermal treatment, may also remove active oxygen-containing groups, e.g. hydroperoxide groups from the oxidized polymer. Removal of these groups is desirable, since the polymer is less reactive after reduction and may be conveniently stored without further reaction taking place.

The final polymeric product may be recovered from solution by steam distillation of the solvent or by precipitation with an acetone-methanol mixture (3:1) or by any other suitable method and is subsequently dried, for example, in a vacuum. The product produced by the oxidation-reduction procedure is an oil-soluble product of lower molecular weight than the starting polymer, copolymer or terpolymer. The molecular weight depends on the extent and conditions employed during the oxidation and reduction. Ultimately, upon reduction of the hydroperoxidized polymers, hydroxylated and fragmented or degraded polymeric materials are formed which have viscosity average molecular weights of from about ⅓ to about ⅒ the molecular weight of the original material, i.e. have a viscosity average molecular weight of about 10,000 to about 150,000, preferably 25,000 to 100,000. The amount of active oxygen-containing groups, groups containing oxygen as hydroxyl groups (OH) is essentially the same after reduction as prior to reduction and thus is in the range of from 1 to 50 millimoles per 100 grams of polymer, preferably 2 to 20 millimoles. Examination of the polymers by the infrared spectroscopy shows that oxygenated groups introduced during a polymer oxidation are retained during reduction. Essentially no active oxygen in the form of hydroperoxides, peroxides, or peracids, however, is detected after reduction by any of the preferred methods.

Illustrative of the foregoing, is an ethylene-propylene rubbery copolymer which is subjected to the aforementioned oxidation and subsequent reduction to yield polymeric fragmentation or degradation products containing hydroxyl groups with minor amounts of carboxyl, keto and aldehyde groups and having a viscosity average molecular weight ranging between about 20,000 and about 60,000.

The copolymers or terpolymers of this invention are employed as additives in concentrations of about 0.1 to about 10 wt. percent, preferably between about 0.5 and about 5.0 wt. percent based on the oleaginous composition being treated, so as to accomplish the desired objects. It is to be understood that such ranges are flexible and will be determined by the particular character of the oleaginous composition to which the additive is added. However, no more copolymer or terpolymer will be added than will be in solution in the oleaginous composition. Typically such additives are sold as concentrates when the additive is present in amounts of from 5 to 50 wt. percent, preferably 10 to 25 wt. percent, weight percent based on the total amount of the solvent employed for the additive, e.g., mineral oils, hexane, heptane and the like.

The copolymers or the terpolymers of the present invention can be employed alone in oleaginous compositions or, if desired, can be employed in combination with other viscosity index improvers in order to affect that characteristic of the base oleaginous composition. If desired, said copolymers or terpolymers may be employed in combination with other additives, for example, pour point depressant, detergent type additives, corrosion inhibitors, anti-oxidants, sludge inhibitors, metal deactivators, etc.

While the disclosure has been directed to an oleaginous composition comprised of a lubricating oil, it is to be understood that the present invention also contemplates that the additives defined herein may, if desired be employed with various other oleaginous compositions such as, for example, gasoline, middle distillate fuels, transformer oils, greases, etc.

The present invention also contemplates that the copolymers or terpolymers produced by the process described herein can be subjected to such after-treatment as may be desired to fit them for particular uses or to impart desired ancillary properties. It is to be understood, therefore, that the copolymers and terpolymers utilized by the present invention can be subjected to chemical modifying treatments, such as halogenation, halogenation followed by dehalogenation, sulfohalogenation by treatment with sulfuryl chloride, or mixtures of chlorine and sulfur dioxide, sulfonation, as well as any other reaction to which hydrocarbons may be subjected. In addition, it is also contemplated that said copolymers or terpolymers can be blended with other copolymers or terpolymers so as to impart various desired properties thereto.

The following examples describe the invention more fully, both from a standpoint of the preparation of the copolymers or terpolymers and of their advantageous use in typical oleaginous compositions.

Example 1

This example serves to illustrate preparation of a copolymer of this invention and the subsequent use thereof.

An ethylene-propylene rubber prepared from 50 mole percent ethylene and 50 mole percent propylene and having a viscosity average molecular weight of 106,000 was dissolved in 300 grams of cumene over a period of about 5 hours at 60° C. To this polymer solution was added 10 grams of absolute methanol and 2.7 grams of cumene hydroperoxide. A stream of air containing 20 wt. percent oxygen was introduced into the reaction mixture. At the end of 7 hours, the product was analyzed and found to contain 4.0 millimoles of HOO per 100 grams of product. After isolation by precipitation with methanol, the product was redissolved in 450 ml. n-heptane and reduced at a temperature of 25° C. for about 7½ hours using 13 wt. percent aqueous solution of sodium sulfite which converted the hydroperoxide radicals into hydroxyl radicals. After precipitation and washing of the product, it was found to have a viscosity average molecular weight of 35,000.

A base oil having the following inspections:

| | |
|---|---|
| Flash point ° F | 450 |
| API gravity | 29.0 |
| Pour point ° F | +15 |
| Viscosity index | 100 |
| Viscosity SUS at 100° F. | 325–340 |
| Viscosity SUS at 210° F. | 50 | had added thereto about 3.6 wt. percent of the degraded hydroxy ethylene-propylene copolymer. This gave an oil having a SUS viscosity at 210° F. of 139.5, a V.I. of 131.3 and a sonic breakdown of only 15.2%. The original ethylene-propylene rubbery copolymer, before treatment, when added to the same oil in the same amount on a strictly comparable basis gave an oil of 156.1 SUS at 210° F., a V.I. of 109.9 and a sonic breakdown of 30.7%.

The sonic breakdown is a standard measurement for determining the shear stability of the novel oil compositions, the lower percentage reflecting that the compositions have the greatest resistance to shear breakdown and hence are the most stable under the automotive lubricating conditions. The sonic breakdown test method is intended solely for the examination of polymers to be used as V.I. improvers.

In this method the sample under test is blended with an approved base stock to a viscosity at 210° F. of 15.0±0.5 centistokes. A portion of the blend is subjected to sonic shearing forces at a specific power input and a constant temperature for 15 minutes. Viscosities are determined on the blend both before and after the treatment; the decrease in viscosity after the treatment is a measure of the molecular breakdown of the polymer under test.

There will be an appreciable daily variation in the severity of the test. It is therefore customary to examine a blend of a standard sample of known behavior each time a test is made, and to use this as a reference to establish the correct value for the sample under test. The corrected value is reported as the Percent Sonic Breakdown.

Example 2

This example illustrates the importance of sufficient oxidation of the starting polymer so as to attain the desired utility hereinbefore set forth.

Ethylene-propylene copolymer of a viscosity average molecular weight of 251,000 was peroxidized by bubbling air through cumene solution of the polymer (6.0 wt. percent concentration) for 7 hours at 60° C. There was also present in the reacting mixture 0.8 wt. percent of cumene hydroperoxide and 1.9 wt. percent absolute methanol. The ethylene-propylene copolymer hydroperoxide was precipitated from a methanol solution, washed thoroughly, and dried in a vacuum oven. It contained 3.89 millimoles of HOO per 100 grams of polymer. A heptane solution of the hydroperoxide was then treated with an aqueous solution (concentration 14.0 wt. percent) of sodium sulfite and the heterogenous mixture was vigorously stirred at room temperature for 7 hours. The aqueous layer was removed and the heptane layer was washed thoroughly with water. The hydroxyl containing degraded ethylene-propylene copolymer had a viscosity average molecular weight of over 100,000. It was likewise employed in the amount of 3.6 wt. percent in a mineral lubricating oil similar to that described in Example 1. It was too viscous at this concentration to find utility as a V.I. improver; a 1.0% solution gave a V.I. of 135.8, an SUS viscosity at 210° F. of 627, and an extremely high sonic breakdown of 44%.

Material similar to the above material was then tested but the peroxidation time was increased from 7 hours to 24 hours using the same temperature, i.e., 60° C. This gave a hydroperoxide derivative containing 45.2 milliequivalents of HOO per 100 grams of sample. This material, upon being reduced with sodium sulfite and being blended with the same base oil and in the same amount as before stated, gave the following results: viscosity index 131, viscosity of composition 73.0% SUS at 210° F., and sonic breakdown 3.0%.

The criticality of suitable oxidation is deemed readily apparent from the foregoing run.

Example 3

Two hydroxylated ethylene-propylene copolymers similar to that of Example 1 and having viscosity average molecular weights of 26,000 and 400,000 were evaluated for certain physical properties, e.g. as to shear stability as represented by sonic breakdown and by two engine tests.

The test base oil utilized, a paraffinic type base oil, of about 54.3 SUS at 210° F. and about 190 SUS at 100° F. and having a viscosity index of about 109, contained 10.5 wt. percent of the hydroxylated ethylene-propylene degraded copolymer, or polyisobutylene, etc., additive to be tested; 0.9 wt. percent of a 300 base number overbased calcium sulfonate (Bryton C-300); 3.8 wt. percent of a nitrogen based ashless dispersant; 1.3 wt. percent of a dialkyl dithiophosphate; and 0.5 wt. percent of a lubricating oil pour depressant.

In order to compare the shear stability of the additive of this invention with the conventional additive, the hydroxylated ethylene-propylene copolymer was compared with a commercially available polyisobutylene V.I. improver. The resulting data are as follows:

| Additive | Kinematic Viscosity (centipoises) | | V.I. |
|---|---|---|---|
| | 100° F. | 210° F. | |
| HO-E-P (40,000 mol. wt.) | 146.50 | 20.75 | 136 |
| HO-E-P (26,000 mol. wt.) | 119.40 | 16.40 | 133 |
| Polyisobutylene | 74.58 | 11.57 | 136 |

The same two oil compositions of this invention were subjected to CRC-L-38 engine tests in order to determine the bearing weight loss in milligrams resulting from a use of the novel oil compositions in a standard L-38 engine test. All products satisfactorily passed this test. The results are as follows:

L-38 TEST RESULTS

Polymer: Bearing wt. loss (mg.)
    HO-E-P (40,000 mol. wt.) _____ 38.3
    HO-E-P (26,000 mol. wt.) _____ 25.1

A Cyclic Temperature Sludge Test was carried out to determine the sludge dispersant properties of each of the copolymeric products. This standardized sludge test may be described as follows: The Cyclic Temperature Sludge Test is designed and is to subject test oils to conditions which have been shown to give sludge deposits similar to those obtained in stop-and-go driving such as would be experienced in taxicab operation. Briefly described, in this test a Ford 6-cylinder engine is run on a dynamometer stand through alternate cycles, the first cycle lasting five hours, at 1500 r.p.m., and the second cycle lasting two hours, at the same operating speed, with the oil sump and water jacket temperatures being slightly higher in the second cycle than in the first. The two cycles are alternated in sequence until the desired total test time has elapsed. Makeup oil is added as required so as to maintain the oil level in the crankcase at all times between about 3½ and 4 quarts. At the end of selected periods of test time, the engine is inspected by disassembling it sufficiently to permit visual examination of several of the parts, including the rocker arm assembly, the rocker arm cover, the cylinder head, the push rod chamber and its cover, the crankshaft and the oil pan. These parts are visually and quantitatively rated for sludge deposits, using a CRC sludge merit rating system in which a numerical rating of 10 represents a perfectly clean part, and the numerical scale decreases to a minimum value representing a part covered with the maximum amount of sludge possible. The several merit ratings are averaged to give an overall engine merit rating.

The oil employed in this Cyclic Temperature Sludge Test was a neutral solvent extracted Mid-Continent oil having a flash point of 450° F., an API gravity of 29.0, a pour point of +15° F., a viscosity index of 100, and a viscosity of 325–340 SUS at 100° F. and 50 SUS at 210° F. In making up the test base oil there was added 0.9% of the heretofore mentioned zinc salt of the specific dialkyl diphosphoric acid above defined. There was also added to the base oil 3.5 wt. percent of a colloidal dispersion of barium carbonate and barium nonyl phenate stabilized by a phosphosulfurized polyisobutene as a dispersant. The composition was prepared by admixing nonyl phenol with barium hydroxide and phosphosulfurized polyisobutylene so as to produce the barium nonyl phenate and the mix was finally blown with carbon dioxide so that the excess unreacted barium was converted into barium carbonate. This is a well known and conventionally employed antioxidant and detergent for lubricating oils.

This test base oil, under comparative conditions, was then subjected to the Cyclic Temperature Sludge Test; two portions of the oil containing 1% by weight of hydroxylated copolymers referred to above and the other aliquot containing 1% by wt. of polyisobutylene (Mv 130,000). The sludge merit ratings were as follows:

4-103 CYCLIC TEMPERATURE SLUDGE TEST
[Sludge merit rating]

| Hours | HO-E-P (40,000 Mv) | HO-E-P (26,000 Mv) | Polyisobutylene (130,000 Mv) |
|---|---|---|---|
| 21 | 9.87 | 9.93 | 10.0 |
| 105 | 9.05 | 9.62 | 9.76 |
| 147 | 8.60 | 9.26 | 9.10 |
| 180 | 8.20 | 8.9 | 7.50 |
| 210 | 7.80 | 8.1 | 6.95 |
| 231 | 7.60 | 7.5 | 6.0 |
| 252 | 7.20 | 6.9 | |
| 273 | 6.80 | 6.6 | |

The results are graphically compared in the accompanying drawing which is incorporated herein by reference. From these results it is readily apparent that the copolymers within the scope of this invention evidence unobvious improvements over conventional additives.

Example 4

A number of hydroxylated ethylene-propylene copolymers were prepared in accordance with the method of Example 1 and compared with an unmodified ethylene-propylene copolymer and with polyisobutylene. The comparative data are as follows:

| 3.6 Wt. Percent Polymer in Barosa 43 [1] | V.I. | Thickening Power [2] (SUS at 210° F.) | Percent Sonic Breakdown |
|---|---|---|---|
| Hydroxylated Et-Prop. Copoly | 131.3 | 139.5 | 15.2 |
| Hydroxylated Et-Prop. Copoly | 131.2 | 166.3 | 11.5 |
| Hydroxylated Et-Prop. Copoly | 130.0 | 154.6 | 12.5 |
| Et.-Prop. Copoly | 109.9 | 356.1 | 30.7 |
| Polyisobutylene | 137.1 | 103.6 | 27.6 |

[1] Barosa 43.—A mixed paraffinic and naphthenic oil of 5.46 cs. at 210° F.
[2] Thickening power.—The viscosity of a Barosa 43 oil containing 2% polymer by weight.

The hydroxylated copolymers evidence greater thickening power and improved shear stability as evidenced by sonic breakdown upon comparison with little or no effect on V.I. improvement characteristics.

Example 5

This example presents data to show that ethylene-propylene rubber, which is hardly soluble in lubricating oil, can be rendered soluble and more effective than polyisobutylene, as a V.I. improver, by being gently oxidized with any one of a plurality of oxidizing agents.

| Run | Catalyst | Conc. (wt. Percent) | Base Stock | KV100 | KV210 | V.I. | Percent Sonic Breakdown |
|---|---|---|---|---|---|---|---|
| 1 | Cumene, Hydroperoxide+air | 3.6 | Barosa 43 | 238.2 | 29.37 | 131 | 15.2 |
| 2 | do | 3.6 | do | 274.5 | 32.75 | 130 | 12.5 |
| 3 | Vazo-air | 1.0 | Ref. Oil 150A[1] | 88.0 | 12.14 | 128 | 27.0 |
| 4 | t-Butyl peroxide | 1.0 | Ref. Oil 150A[1] | 176.5 | 24.22 | 135 | 66.0 |
| 5 | $N_2O_4$ | 0.7 | Ref. Oil 150A[1] | 89.0 | 12.54 | 130 | 61.0 |
| 6 | $N_2O_4$ | 0.8 | Ref. Oil 150A[1] | 89.0 | 12.48 | 130 | 55.5 |
| 7 [2] | | 2.0 | Ref. Oil 150A | 84.5 | 11.89 | 130 | 25.0 |

[1] A solvent extracted, neutral, paraffinic type oil of about 46.53 SUS at 210° F. and 189.9 SUS at 100° F.
[2] Polyisobutylene (Mv 130,000).

These products are all more potent thickeners than polyisobutylene and have viscosity indices which are comparable to polyisobutylene. In several instances they have lower sonic breakdowns.

What is claimed is:

1. A lubricant comprising a major proportion of a lubricating oil and a minor proportion, sufficient to improve the lubricating properties of the oil, of a hydroxylated degraded ethylene-alpha olefin polymer originally of a viscosity average molecular weight in excess of 50 and up to about 500,000 and containing hydrogen directly attached to tertiary carbon atoms, said degraded polymer being selected from the group consisting of copolymers of 20–85 wt. percent ethylene and 15–80 wt. percent $C_3$–$C_{10}$ alpha olefin, terpolymers of 20–85 wt. percent ethylene, 15–80 wt. percent propylene and 0.5–20 wt. percent of a $C_6$–$C_{15}$ alicyclic or aliphatic nonconjugated diolefin and combinations thereof and having a viscosity average molecular weight of between about 10,000 and 150,000 and at least 1 millimole of combined oxygen per 100 grams of polymer contained therein.

2. The lubricant of claim 1 wherein the ethylene-alpha olefin polymer is an ethylene-propylene copolymer.

3. The lubricant of claim 1 wherein the ethylene-alpha olefin polymer is an ethylene-propylene-nonconjugated diolefin terpolymer.

4. The composition of claim 1 wherein said ethylene-alpha olefin polymer is present in amounts of from 0.01 to 10.0 wt. percent based on said lubricant.

References Cited
UNITED STATES PATENTS

| | | | |
|---|---|---|---|
| 2,334,996 | 11/1943 | Davis | 252—55 |
| 2,430,993 | 11/1947 | Rehner et al. | |
| 2,837,496 | 6/1958 | Vandenberg. | |
| 2,934,487 | 4/1960 | Whitney. | |
| 2,982,728 | 5/1961 | Whitney. | |
| 3,082,192 | 3/1963 | Kirshenbaum. | |

DANIEL E. WYMAN, *Primary Examiner.*
PATRICK P. GARVIN, *Examiner.*
W. H. CANNON, *Assistant Examiner.*